United States Patent
Welch, Jr. et al.

[15] 3,658,366
[45] Apr. 25, 1972

[54] UNDERWATER PIPELINE CONNECTION

[72] Inventors: Robert W. Welch, Jr., Columbus, Ohio; George H. Bolton, New York, N.Y.; John P. Oliver; Alfred W. Wedel, both of Houston, Tex.

[73] Assignees: Columbia Gas System Service Corporation, Wilmington, Del. by said Welch and Bolton; Cameron Iron Works, Inc., Houston, Tex., by said Oliver and Wedel

[22] Filed: Apr. 23, 1970

[21] Appl. No.: 31,257

[52] U.S. Cl..................................285/24, 29/237, 61/72.3, 166/0.6, 285/31, 285/168
[51] Int. Cl.........................................................F16l 35/00
[58] Field of Search..................285/168, 31, 24, 27, 325, 18, 285/163, 164, 165, 166, 167, 184, 261, 272; 61/72.3, 72.4, 72.5; 166/0.5, 0.6; 29/237, 429

[56] References Cited

UNITED STATES PATENTS

| | | | |
|---|---|---|---|
| 486,986 | 11/1892 | Schinke | 61/72.3 X |
| 3,352,356 | 11/1967 | Wakefield | 61/72.3 X |
| 3,431,739 | 3/1969 | Richardson et al. | 61/72.3 X |
| 3,515,414 | 6/1970 | Kowalewski | 285/261 X |

Primary Examiner—Dave W. Arola
Attorney—Curtis, Morris and Safford

[57] ABSTRACT

In an underwater pipeline connection system, a pair of swivelably interconnected pipes, supported in angular relation above the ends of a pair of pipeline sections, are provided with swivel connection members mounted on the free ends thereof which are adapted to be operably connected with taunt wire lines for guiding the swivel members and pipes from remote locations to positions adjacent the ends of said pipelines, actuator members connected between said swivels and said wires are adapted to move said pipes towards an aligned configuration when the swivels are thus positioned, thereby moving the swivels into engagement with the pipeline ends to form a completed connection therebetween.

17 Claims, 3 Drawing Figures

PATENTED APR 25 1972

INVENTORS
ROBERT W. WELCH, Jr
GEORGE H. BOLTON
JOHN P. OLIVER
ALFRED W. WEDEL

BY Curtis, Morris & Safford
Attorneys

PATENTED APR 25 1972 3,658,366

INVENTORS
ROBERT W. WELCH, Jr
GEORGE H. BOLTON
JOHN P. OLIVER
ALFRED W. WEDEL

BY Curtis, Morris & Safford
Attorneys

UNDERWATER PIPELINE CONNECTION

This invention relates generally to underwater pipeline connections, and more particularly, to a method and apparatus for interconnecting the spaced free ends of a pair of in situ pipeline sections.

Underwater pipeline connections of the above type have previously been proposed for a variety of underwater pipeline applications, such as, in connecting a pipeline to the riser of offshore oil and gas drilling platforms, or for replacing broken sections of pipeline. Typically, the previously proposed connections require extensive diver operations and removal of the pipeline ends from the ocean floor for welding on board specially designed and equipped barges. More specifically, one known method of joining the riser pipeline of an offshore drilling platform to the shore-directed pipeline involves a series of steps wherein the riser is initially secured to the platform structure with its free end on the ocean bottom and the pipeline is initially laid to a point beyond the platform so as to overlap the riser end to which the pipeline is to be connected. At this point a diver is sent to the bottom to determine the point on the pipeline to be connected to the riser and to mark the pipe for cutting and welding. The diver generally makes this determination by merely sighting an approximate point on the pipeline at which the connection is to be made. On completion of this highly inaccurate "eyeball" operation the pipe and riser are lifted to a specially constructed barge where the pipeline is cut in accordance with the diver's mark. The ends of the pipeline and riser are thence welded and returned to the ocean bottom where divers must be present to properly seat and secure the riser to the platform.

Pipeline connection systems of this type are also used to interconnect an underwater pipeline with a main header line or to repair and replace a broken section of pipeline. However, the system is expensive and is hindered by the accuracy of the diver's measurement. Moreover, in the case of pipeline connection with a riser pipe, the pipeline is often cut longer than is required so that slack in the pipeline must be taken up at the platform; this causes the riser to move or bend to compensate for the excess length, thereby rupturing the riser clamps on the well structure or the riser support platforms and creating excess stresses in the riser pipe and the pipeline itself which weaken the structure thereof and cause relatively rapid pipe failures. Moreover, these operations are expensive, due to the excess time the pipe handling equipment and divers must remain at the connection site in order to perform the repetitive pipe lifting and placement steps. When these operations are performed in deep waters, it has been found that they will generally take from 3 to 5 days to complete.

Accordingly, it is an object of the present invention to interconnect underwater pipeline ends in a relatively rapid and automatic operation. Another object of the invention is to automatically connect pipeline ends by a substantially remotely controlled process. A further object of the invention is to provide a relatively inexpensive and simply constructed underwater pipeline connection.

In accordance with an aspect of this invention, a pair of pipes are swivelably interconnected and held in an angular relation in an inverted V configuration above the free ends of the pipeline sections which are to be interconnected. The free ends of each of the articulated pipes are provided with a swivel connector, and the distance between the connectors when the pipes are held in this angular relation is less than the distance between the pipeline ends. Taunt wire guidelines are operably connected to each of the end swivel connectors to guide the connectors to positions opposite the ends of the pipelines and to maintain the swivels in accurate alignment therewith. Hydraulic actuator members are operably connected between the end swivel connectors and the guidelines for moving the pipes towards an aligned configuration whereby the distance between the swivel connectors is increased and their stub pipes are moved into engagement with the free ends of their associated adjacent pipeline.

The construction of an underwater pipeline connection in this manner, and in accordance with this invention eliminates the costly installation barges' time and diver time required in the prior art devices. Moreover, the present invention permits the interconnection of underwater pipelines to be completed on the ocean bottom with minimal diver supervision and in a substantially remotely controlled process which can be completed in less than eight hours even in deep water operations.

The above, and other objects, features, and advantages of this invention, will be apparent in the following detailed description of the illustrative embodiment of this invention which is to be read in connection with the accompanying drawings, wherein:

FIG. 1 is a diagrammatic side view of an underwater pipeline connection apparatus, according to an embodiment of the present invention, prior to completion of the pipeline connection;

Figure 2:
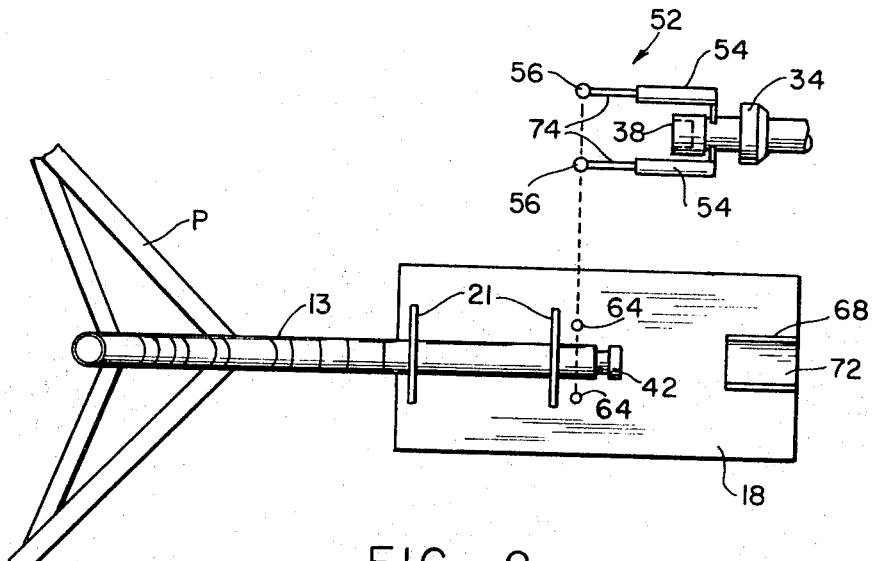
FIG. 2 is a diagrammatic plan view taken on line 2—2 of FIG. 1.

Referring now to the drawings in detail, and initially to FIG. 1 thereof, it will be seen that the underwater pipeline connection apparatus of the present invention, comprises an articulated pipeline 10 which is supported above a pair of pipeline sections 12 and 14 which are to be interconnected thereby. In the embodiment illustrated, pipeline 12 comprises the base connection of a riser pipe 13 which is secured by brackets 15 to an offshore drilling platform P whereas pipeline 14 constitutes a header pipe for conveying oil or gas from platform P to a shore-based installation. The free ends 16 and 17 respectively, of pipelines 12 and 14 are supported in a relatively fixed spaced relation on the ocean floor by platforms 18 and 19, each of which include support brackets 21 for retaining their associated pipes thereon. It is noted that while a riser connection system is described and illustrated herein, it is foreseen that the underwater pipeline connection system of the present invention is equally well adapted for use in interconnecting an underwater pipeline with a side valve connection in a main header pipeline or for replacing an intermediate section of a previously laid pipeline, to repair a break therein.

Articulated pipeline connector 10 is formed by a pair of pipes 20 and 22 having substantially the same diameter as pipes 12 and 14 respectively. Pipes 20 and 22 are swivelably interconnected at their ends 24 and 26 respectively by double swivel member 28 which is of known construction. In one embodiment found suitable for use in the present invention, a swivel 28 is utilized which permits pipes 20 and 22 to move with respect to the horizontal swivel axis at angles up to 10°. Hereinafter, swivel 28 is referred to as either a double or a 20° swivel member since the total differential displacement between pipes 20 and 22 obtainable with this swivel will be 20°.

The opposed ends 30 and 32 respectively of pipes 20 and 22, are provided with single swivels 34 and 36, respectively, each of which has an outwardly extending rigid stub pipe 37 secured therein. Swivels 34 and 36 may permit any desired degree of pipe movement, however, it has been found that 10° swivels are suitable for use with the central 20° swivel 28; these swivels limit their associated pipes to movement about the horizontal swivel axis to angles of up to 10°.

Figure 3:
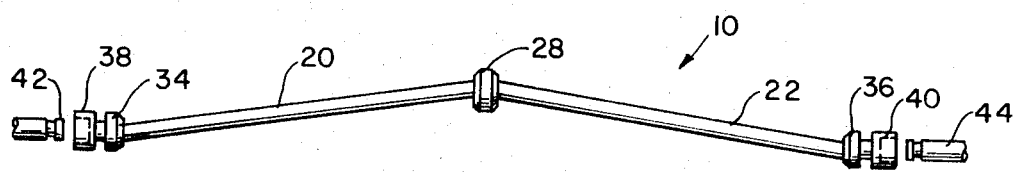
FIG. 3 is a side view similar to FIG. 1 of the pipeline connection apparatus in full form.
Figure 2:
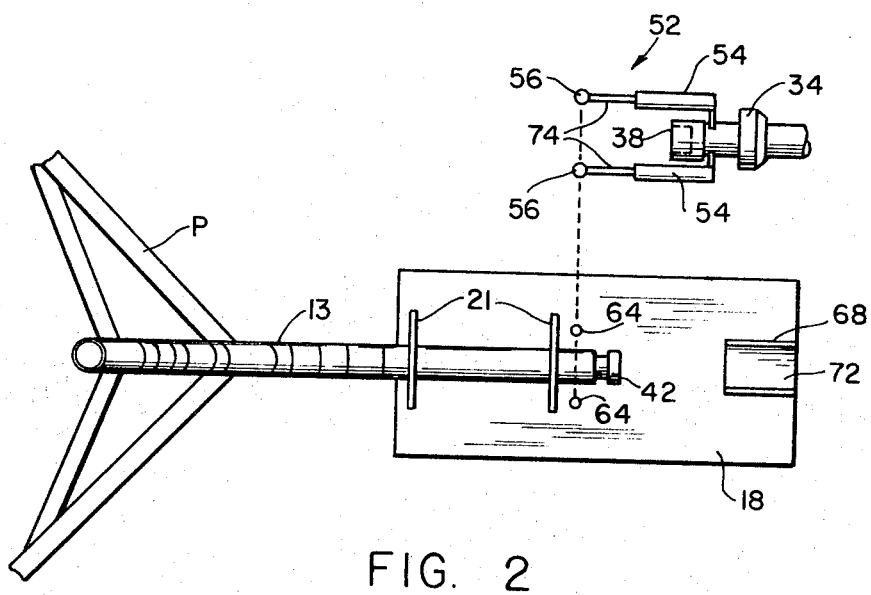
Figure 3:
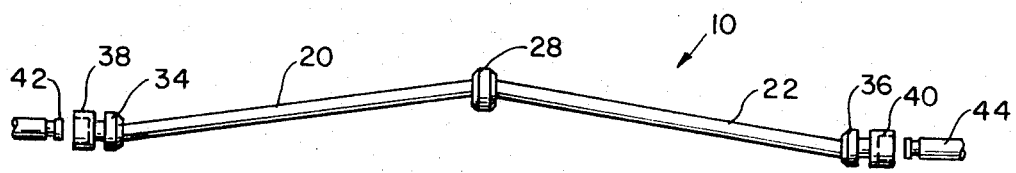

Stub pipes 37 in swivels 34 and 36 are provided with female connectors 38 and 40 respectively, which are adapted to receive male connectors or ends 42 and 44 respectively of pipelines 12 and 14, when connector 10 is moved into position adjacent these ends (note FIG. 3).

As seen in FIG. 1, articulated connector 10 is held in position above and between ends 42 and 44 of pipelines 12 and 14 by support member 46, which is, in turn, supported above the ocean floor from a crane or similar device mounted on an adjacent barge (not shown) by cables 47. Member 46 is provided with a plurality of connecting lines 48 and 50 on its lower surface which suspend connection pipeline 10 below the support member. Connecting line 48 supports double swivel 28 in a vertical offset relation with respect to swivel assemblies 34 and 36. The latter are suspended from member 46 by lines 50 through swivels 34 and 36 and actuator and guide assemblies 52 which are more fully described hereinafter. Connecting lines 48 and 50 are formed in predetermined lengths to maintain the relative positions of the pipes and swivels, which constitute articulated pipeline 10, in an angular or inverted V-shaped configuration above pipeline ends 42 and 44. In this configuration, the distance between female connectors 38 and 40 is somewhat less than the distance between pipe ends 42 and 44 so that upon lowering, pipeline 10 will readily fit between these ends.

Pipeline 10 is lowered into position between ends 42 and 44 by lowering member 46 from the barge towards the ocean floor by means of cables 47. Member 46 maintains the alignment and configuration of the pipeline components during this lowering operation.

To assist in lowering pipeline 10 into position for connection with pipeline ends 42 and 44, an actuator and guide assembly 52 is provided on each of the female connectors 38 and 40. Members 52 are illustrated diagrammatically in FIG. 2 and include a pair of arms 54 removably mounted at one end to female connector 38, and having guide collars 56 at the free ends thereof. Collars 56 are adapted to slide on taunt wire guidelines 58 which are fixed to platforms 18 and 19, respectively, at locations behind ends 42 and 44, as seen in FIG. 1. In one embodiment taunt wire guidelines 58 are maintained in a relatively rigid vertical configuration by cranes or other support structure mounted on the barge; however, it is foreseen that wires 58 may be similarly held in a vertical position by buoys. It is noted that crane supported taunt lines are particularly useful where adverse wind and weather conditions would tend to sway buoy supported lines.

The lower ends 62 of wires 58 are fixed to platforms 18 and 19 by collar guides 64 which are rigid cylindrical members having tapered end portions 66. The inside diameter of guide collar 56 is substantially the same as the outside diameter of collar guides 64 so that as connector 10 is lowered into position between pipe ends 42 and 44, collars 56 are guided by tapered portions 66 onto collar guides 64 to align female connectors 38 and 40 with their associated pipeline ends. Platforms 18 and 19 are provided with swivel joint seats 68 and 70 respectively, which constitute saddle members adapted to receive swivels 34 and 36 and provide support therefore. Moreover, the saddle portion or interior trough surface 72 of members 68 and 70 provide an additional guide mechanism which cooperates with collar guides 64 to provide a three-point alignment system to assure accurate positioning of female connectors 38 and 40 in aligned spaced relation with pipe ends 42 and 44 respectively.

Referring again to FIG. 2, wherein swivel 34 is illustrated, for clarity, in an offset position from platform 18, it is seen that actuator arms 54 constitute a pair of hydraulic cylinders or rams having piston rods 74 which carry collars 56 at the free ends thereof. When pipeline 10 is lowered into the desired position on platforms 18 and 19 between ends 42 and 44, cylinders or rams 54 are actuated to draw female connectors 38 and 40 towards their associated pipeline ends. During movement of female connectors 38 and 40, proper alignment is maintained by the connection of collars 56 with collar guides 64 and is further assured by the maintenance of swivels 34 and 36 within saddle portions 68 and 70 which guide the swivel along a straight line. As the rams 54 are compressed the pipes 20 and 22 are permitted to move towards axial alignment by swivels 28, 34 and 36 so that the distance between female connectors 38 and 40 is increased and the female connectors are engaged with pipe ends 42 and 44 to form the desired connection. It is noted that female connectors 38 and 40 and pipe ends 42 and 44 are provided with known pipe sealing mechanisms to form a fluid and gas tight seal therebetween, however, this mechanism forms no part of the present invention and therefore is not shown in the drawings.

In a typical pipeline laying operation contemplating the use of the present invention, the pipelines 12 and 14 are laid underwater in any conventional manner, and are stabilized on the bottom by platforms 18 and 19 respectively. It is noted, these platforms need not be at the same vertical elevation, nor need they be in horizontal alignment since the swivels will, within the limits thereof, compensate for the non-alignment of these pipe ends during and after the connecting operation. Thus, much of the time and expense of prior pipe laying operations is avoided and substantially less diver time is required. Once pipeline ends 42 and 44 are securely positioned within brackets 21 on their associated platforms, a measurement is taken of the straight line distance between predetermined points on saddles 68 and 70 in any known manner, which measurement is then used to determine the lengths required for pipes 20 and 22 in order to assure connection between ends 42 and 44. Articulated pipeline 10 may thence be completely fabricated at a shore-based assembly plant or on an on-site barge. After assembly, pipeline 10 is suspended above the pipelines 12 and 14 by support member 46 and connecting lines 48 and 50. Support member 46 is then lowered beneath the ocean surface to position pipeline 10 between pipeline ends 42 and 44. It is noted that the ends of pipeline 10 may be sealed by any of the conventional removable sealing systems available in the art to prevent entrance of sea water therein during the connecting operation.

During the lowering operation, pipeline 10 is guided to exact alignment with the ends 42 and 44 by taunt lines 58 and guides 56. Once single swivels 34 and 36 are seated in their associated seats 68 and 70 respectively, pistons 54 are actuated to draw female connectors 38 and 40 into engagement with pipeline ends 42 and 44 respectively. Female connectors 38 and 40 and pipe ends 42 and 44, as mentioned above, are provided with sealing systems to insure a leak-proof joint between the pipelines and articulated pipeline 10. It is foreseen that the operation of actuators 52 may be provided by a completely remotely controlled system, or alternatively, a diver may conveniently be sent down to the ocean bottom to observe the connection operation and to manually actuate rams 54 upon seating of swivels 34 and 36 in their associated supports or saddles 68 and 70. It is thus seen that a relatively simple and inexpensive method and apparatus is provided for joining pipeline ends underwater in a convenient and rapid operation which requires minimal diver time or control for the operation thereof.

While the above embodiment of the present invention has been described herein with reference to the accompanying drawings, it is to be understood that the invention is not limited to that precise embodiment, and that various changes and modifications may be effected therein by one skilled in the art without departing from the scope or spirit of this invention.

What is claimed is:

1. An articulated pipeline assembly for interconnecting the spaced ends of two pipelines and an assembly support means holding said assembly in a generally inverted V-shaped configuration while the ends of the assembly are guided to positions adjacent the respective pipeline ends, said assembly comprising a pair of pipe sections each of which has first and second end portions, swivel means for interconnecting said first end portions of said pipe sections, said swivel means being located at the apex of said V when said assembly is held in said inverted configuration by said support means, and two connecting units mounted respectively on each of said second end portions for connecting each of said second end portions to an associated one of said, spaced pipeline ends, said swivel means being adapted to allow variation in the angular relation between said pipe sections to thereby vary the distance between said connecting units whereby said assembly is supported in said inverted V-shaped configuration between said pipeline ends by said support means and then extended to join the ends of said pipe sections with said pipeline ends.

2. An articulated pipeline assembly as defined in claim 1 wherein said connecting units comprise swivel means.

3. An articulated pipeline section as defined in claim 1 wherein said means swivelably interconnecting said pipe first end portions comprises, a double swivel connecting member adapted to limit each of said pipes to a 10° displacement about its swivel axis whereby a total differential displacement of up to 20° is obtainable between said pipes.

4. Apparatus for interconnecting two spaced pipeline connections, comprising, a pair of pipe sections each of which has first and second end portions, means for swivelably interconnecting said first end portions, two connecting units mounted respectively upon said second end portions for connecting each of said second end portions to a respective one of said spaced pipeline connections, means supporting said pipe sections in a generally V-shaped configuration wherein said means for swivelably interconnecting said pipe sections is located at the apex of said V, and means for moving said pipes towards an aligned configuration to increase the distance between said connecting units for connection thereof to said respective pipeline connections.

5. Apparatus as defined in claim 4, wherein said means for moving said pipes comprises means adapted to be connected between each of said connecting units and its associated pipeline end for moving said connecting units towards said pipeline ends.

6. Apparatus as defined in claim 5 including means for guiding said connecting units to positions opposite their associated pipeline ends.

7. Apparatus as defined in claim 6 wherein said guiding means comprises, a plurality of taunt wire guidelines operably engaged with each of said connecting units and their associated pipeline ends.

8. Apparatus for interconnecting the spaced ends of a pair of pipeline sections comprising, a pair of pipe sections having first and second end portions, a double swivel member interconnecting the first end portions of each of said pipe sections, a single swivel member mounted on each of said second end portions for connecting an individual second end portion to a respective one of said spaced pipeline ends, means supporting said pipe sections and said swivels in a generally V-shaped configuration wherein said double swivel is located at the apex of said V, means for guiding each of said second end portions and said single swivels to positions opposite a respective one of said spaced pipeline ends, and means for moving said pipes towards an aligned configuration whereby said pipes move in said swivels with respect to each other to increase the distance between said single swivels for connection thereof to said respective pipeline ends.

9. Apparatus as defined in claim 8 wherein said guide means comprises an individual support platform fixed to each of said pipeline free end portions and a plurality of taunt wire guidelines fixed to each of said platforms and operably connected to said single swivels to guide said swivels and said second end portions to positions opposite said pipeline ends.

10. Apparatus as defined in claim 9 wherein said moving means comprises, means operably connected between said swivels and said taunt lines for urging said swivels into engagement with their respective pipeline end whereby said pipes are moved towards an aligned position.

11. Apparatus as defined in claim 8 wherein said double swivel member is a 20° swivel.

12. Apparatus as defined in claim 11 wherein said single swivel members are 10° swivels.

13. The method of interconnecting two spaced pipeline connections comprising, the steps of, swivelably interconnecting a pair of pipes having connecting members on the free ends thereof, holding said pipes in an angular relation about said swivel connection, positioning each of said connecting members adjacent a respective one of said spaced pipeline connections and moving said pipes towards an aligned configuration whereby said connecting members are moved into engagement with said respective pipeline connections.

14. The method of interconnecting the spaced ends of a pair of pipeline sections by means of an articulated pipeline section including a pair of swivelably interconnected pipes having connecting members mounted on their free ends, said method comprising, the steps of, holding said pipes in an angular relation about said swivel interconnection, positioning each of said connecting members adjacent a respective one of said spaced pipeline ends, and moving said pipes towards an aligned configuration whereby the distance between said connecting members is increased and said members are moved into engagement with said respective pipeline ends.

15. The method as defined in claim 14 wherein said step of positioning includes the step of guiding said articulated pipeline section from positions remote from said pipeline sections to positions adjacent said spaced pipeline ends.

16. The method as defined in claim 15 wherein said step of guiding comprises the step of, moving said connecting members along a plurality of taunt wire guidelines.

17. The method as defined in claim 16 wherein said step of moving comprises the steps of, operably engaging said connecting members and said guidelines and moving said connecting members with respect to said guidelines whereby said connection members are engaged with said respective pipeline ends.

* * * * *